INVENTORS
JOHN G. S. BILLINGSLEY
DAVID E. NICKLES

BY Wilkin E. Thomas Jr.
AGENT

United States Patent Office 3,600,490
Patented Aug. 17, 1971

3,600,490
PROCESS OF FORMING A RIPPLE-FREE STRUCTURE FROM A POLYMERIZABLE MATERIAL THAT SHRINKS UPON POLYMERIZATION
John G. S. Billingsley, Newark, Del., and David E. Nickles, Williamsville, N.Y., assignors to E. I. du Pont de Nemours and Company, Wilmington, Del.
Filed July 23, 1969, Ser. No. 843,985
Int. Cl. B29d 7/02
U.S. Cl. 264—171
11 Claims

ABSTRACT OF THE DISCLOSURE

A process for casting a structure having at least one ripple-free surface from a polymerizable material that shrinks upon polymerization which comprises coating a substantially smooth casting surface with a liquid, covering the liquid coated casting surface with a film that shrinks as the polymerizable material shrinks, depositing the polymerizable material on the film, and polymerizing the polymerizable material. The liquid is applied in a manner such as to form a continuous layer between the casting surface and the film which wets both surfaces, so that the surface tension of the liquid will maintain them in intimate contact without inhibiting lateral movement of the film relative to the casting surface. Continuous casting and a process for casting structures having both surfaces ripple free are also provided for.

CROSS REFERENCE TO RELATED APPLICATIONS

This invention relates to the subject matter of U.S. application Ser. No. 794,838, filed on Dec. 19, 1968, by R. B. Duggins for a Method of Producing a Cast Simulated Marble Structure, in that the present invention is useful as an improvement on the process described therein. This invention also relates to the subject matter of U.S. application Ser. No. 844,509, filed on July 24, 1969, by N. L. Hall et al. for an Improved Multi-Colored Plastic Product and Its Manufacture in that the present invention can be used to improve the product described therein.

BACKGROUND OF THE INVENTION

In the process of casting substantially smooth structures from polymerizable materials that shrink upon polymerization, one of the problems that must be overcome is the problem of producing a substantially stress-free structure without ripples on its surface. If the polymerizable material is cast directly on the casting surface it will often stick to the surface, so that it is difficult to remove. If, in addition, the polymerizable material shrinks as it polymerizes, then, if it sticks to the casting surface it cannot shrink freely and localized stresses will be formed during hardening.

One way to avoid these probems is to coat the casting surface with a release agent, but this causes problems if the release agent is not compatible with the polymerizing material, and, as will be discussed below, if the material polymerizes unevenly. Another way to avoid the problem is to cast the structure on or between sheets of compatible plastic films. By compatible it is meant that the film must be made from a material that will not be seriously attacked by the polymer and can withstand the polymerization temperature. Furthermore the film must have shrinkage properties that are similar to the shrinkage properties of the polymerizable material so that the film will shrink with the polymerizable material as it polymerizes, to prevent the formation of an uneven surface caused by wrinkling and gathering. The use of a release film that shrinks as the polymer shrinks is described in U.S. application Ser. No. 794,838..

Even with the use of a coated release agent or a release film, however, if the structure cures unevenly, as is usually the case, certain areas of the mass will harden and shrink unevenly. As localized shrinking occurs, the structure will pull away from the casting surface, drawing any film present with it, so that the finished product will have a rippled surface due to the uneven cure. Since it is difficult to achieve an even cure, because of the inherent inhomogeneity of the reactants, fillers and catalysts in the mass and because of uneven temperature distributions, the problem of a rippled surface is present in most structures cast from shrinkable polymerizable materials. It is particularly prevalent in those systems where rapid cures are effected and it is also particularly prevalent in the continuous casting cases where large structures are being cast.

It is an object of the present invention to provide a process for casting a substantially smooth structure without ripples in at least one of its surfaces from polymerizable materials that shrink upon polymerization. It is a further object of the present invention to provide a process for the formation of substantially smooth structures free from ripples on both surfaces from polymerizable materials that shrink upon polymerization. It is a still further object of the present invention to provide a continuous process for casting ripple-free substantially smooth structures from polymerizable materials that shrink upon polymerization.

SUMMARY OF THE INVENTION

These objects are accomplished by the process of coating the casting surface with a liquid, placing a sheet of film on top of the liquid coated casting surface in a manner such as to insure that said liquid forms a thin continuous layer between the casting surface and the film, depositing the polymerizable material on the film, and polymerizing the polymerizable material. The film must be made from a material that will shrink as the polymerizable material shrinks, and the liquid must be of a nature such that it will not vaporize appreciably at the temperature of the polymerization reaction and such that it will wet both the casting surface and the film. The surface tension of the liquid will then insure intimate contact between the casting surface and the film and the low shear strength of the liquid will allow lateral movement of the film with the polymer during the shrinkage that occurs during polymerization. For a continuous process the casting surface can be a continuous moving casting surface and the film can be a continuous moving film. The liquid, usually an oil, is injected at the point where the film and casting surface are first brought together. To form a structure with both sides ripple free, the polymerizable material is introduced between two liquid coated, film covered casting surfaces, separated by the desired thickness of the structure.

The operation and advantages of the present invention can best be understood by reference to the following figures, wherein.

DETAILED DISCUSSION OF THE DRAWINGS

Figure 1A:
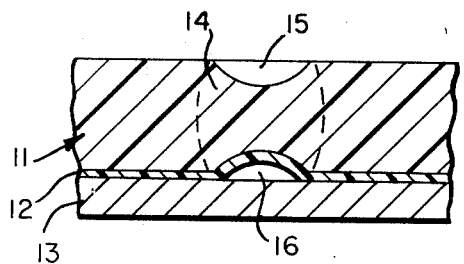
FIG. 1 is a cross-sectional diagram comparing the cast structure as it is formed with and without the liquid layer between the film and the casting surface.

In FIG. 1A the polymerizable material 11 has been deposited on a film 12 which is supported on a casting surface 13. As illustrated, the polymerizable material has begun to cure, and because of inhomogeneities in the mass or the environment, curing has proceeded unevenly so that region 14 has cured at a different rate than the main body of material 11. Since the polymerizable material shrinks upon polymerization, uneven shrinkage has taken place forming a ripple 15 on the upper surface of the structure and a ripple 16, on the lower surface of the structure. The polymerizable material 11 adheres to the film 12 so that the film is drawn away from the casting surface 13, forming an air pocket between the film and the casting surface. When the rest of the structure cures, ripples due to the uneven curing, remain on both surfaces.

Figure 1B:
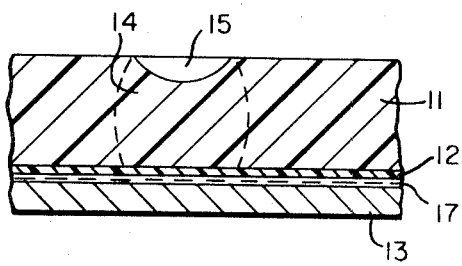

In FIG. 1B the same polymerizable mass 11 has been deposited on a film 12 supported on the casting surface 13. In this case, however, a continuous liquid layer 17 has been laid down between the film and the casting surface. The liquid is chosen from among a group of liquids which will not attack the casting surface or the film, which will not vaporize appreciably at the temperature of the polymerization reaction, and which will wet both the casting surface and the film. By not vaporizing appreciably, it is meant that gas bubbles will not be found between the film and casting surface interrupting the intimate contact between them. If the liquid fulfills these conditions, then the surface tension of the liquid will pull the film into intimate contact with the casting surface and maintain this contact against the force developed by the shrinking polymer, tending to pull the film away from the casting surface. The polymer will still cure unevenly, and a ripple 15 will still be formed on the upper surface of the structure, but because the surface tension of the liquid prevents the film from being drawn away from the casting surface, no ripple is formed on the bottom surface.

The film could have been secured to the casting surface by some relatively rigid material, such as a wax, but the use of a liquid is much to be preferred, because the low shear strength of a liquid allows the film to move laterally relative to the casting surface so that the polymerizable material can shrink freely as it polymerizes and the structure so formed will be substantially stress free.

The liquid used can be any one of a large number of liquids. Liquids such as vegetable oils, silicone oils, petroleum oils, high-molecular weight alcohols and ethers have been found to be suitable in the case where the film is made from polyvinyl alcohol. One such liquid is SAE 10 lubricating oil. In the case of polyvinyl alcohol films, water cannot be used because it will dissolve the film but if other films such as cellophane are used, water may be a useful liquid. The actual liquid used will depend on the type of material used in the film and the casting surface and the type of polymerizable material used. The liquid must also be essentially vapor free, and be of such a nature that it will not vaporize appreciably at the polymerization reaction temperature. If these conditions are not met a gas bubble may form, breaking the contact between the film and the liquid coated casting surface so that the bond is broken. For the same reason, the liquid layer must be continuous.

The liquid layer must be thick enough to supply two adhesion layers, one to the film and the other to the casting surface, with an intermediate lubricating layer to allow the film to move laterally relative to the casting surface. A thickness of 5 to 10 molecular layers is sufficient, but a thickness of 0.01 mil. or greater is most effective. If the thickness of the liquid layer becomes too great, ripples in the surface of the liquid itself can occur, so that a thickness of less than 1.0 mil. is also preferred.

The casting surface can be any casting surface which is substantially smooth. The process is applicable to continuous casting surfaces as well as individual molds for individual cast structures. If the casting surface is not flat, then the undulations in it will be transferred to the cast structure, but the process is still applicable in preventing unwanted ripples until the surface becomes so uneven that sharp protrusions in the casting surface penetrate the liquid layer and break the film layer. Actually, the liquid layer will fill in small imperfections in the casting surface so that these imperfections are not transferred to the cast structure. The surface of the cast structure is, therefore, improved not only because it is ripple free, but also because it is free from the imperfections contained in the casting surface.

The film can be any film that has shrinkage properties which are the same as the shrinkage properties of the polymerizable material. For a polymerizable material comprising a methyl methacrylate polymer-in-monomer sirup a polyvinyl alcohol film fulfills this condition. Films made from other materials will be useful for use with other polymerizable materials.

Any type of polymerizable material can be successfully cast using this process, but the process is naturally most useful in those cases when the polymerizable material shrinks appreciably as it cures. The polymerizable material can be pure polymerizable material or it can contain various types of fillers. The length of time over which polymerization occurs is not relevant, but the process is particularly useful when the polymerizable material is of a type where rapid cures are effected, because uneven curing is more likely to occur in these circumstances. The types of materials that can be used and the details of the process for depositing the materials on the casting surfaces are described in copending U.S. applications Ser. No. 794,838 and Ser. No. 844,509.

Figure 2:
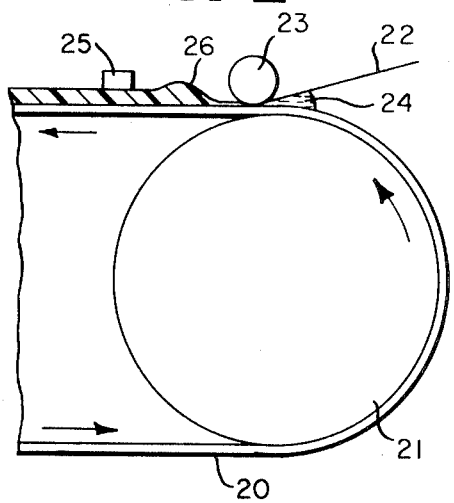
FIG. 2 is a schematic diagram of an apparatus that can be used in the practice of the present invention for the continuous casting of a structure having at least one ripple-free surface.

The process can be used for a simple individual casting process or for a continuous casting process. FIG. 2 illustrates a simple continuous casting apparatus in which the casting surface is a continuous casting surface, in the form of a belt 20, moving in the direction indicated by the arrows. As illustrated only one end of the continuous belt and one of the drums 21 which support it are shown. A film 22 is fed onto the casting surface in a manner such that the film 22 and casting surface 20 are forced together. Any convenient means of forcing the film and casting surface together can be used. In the situation illustrated, they are brought together between two rollers, roller 23 and drum 21. Liquid 24 is introduced at the point where the film and the casting surface first come together and is applied in a manner such that it forms a continuous coating. To insure that the film and casting surface are in relatively intimate contact, roller 23, which in the situation illustrated is a rubber coated metal roller, is applied with a force of between 0 and 80 p.s.i.g. By intimate contact, it is meant that the film and casting surface are brought together and separated by only the liquid layer. The polymerizable material 26 is then deposited on the film coated casting surface, and a doctor knife 25 is used to set the thickness of the cast structure.

The process described has been used to form a structure with one ripple-free surface, that next to the casting surface. By using two casting surfaces each with a film coating held to the casting surface with a liquid layer, as described above, and by introducing the polymerizable material between the two film covered liquid coated casting surfaces, it is expected that structures with both surfaces free from ripples can be formed. This process can also be applied to a simple individual casting process or to a continuous casting process.

Figure 3:
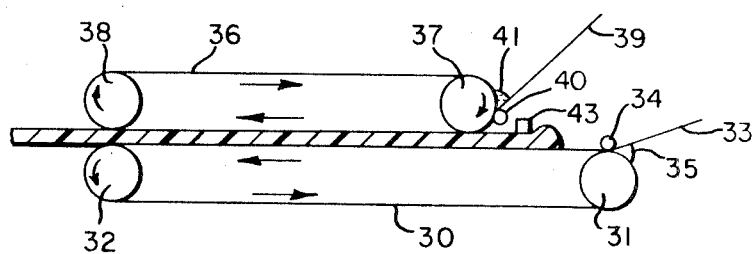
FIG. 3 is a schematic diagram of an apparatus that can be used in the practice of the present invention for the continuous casting of a structure having both surfaces ripple-free.

FIG. 3 illustrates a simple apparatus that can be used in the process of continuous casting a structure without ripples on either surface. The lower casting surface is a continuous belt 30 mounted on drums 31 and 32 and moving in the direction indicated by the arrows. A film 33 is applied between roller 34 and drum 31. Liquid 36 is applied as shown at the place where the film and casting surface first come together. The upper casting plate 36 is also a continuous belt mounted on drums 37 and 38 and moving in the direction indicated by the arrows. A film 39 is applied between roller 40 and drum 37, and liquid 41 is applied as shown in the region in which the film 39 and casting surface 36 first come together. The two moving belts are separated by a distance equal to the desired thickness of the structure, and the polymerizable material 42 is introduced between the two film covered liquid coated casting surfaces by depositing it on the film covering the lower casting surface and letting the movement of the lower casting surface draw it between the two casting surfaces. A doctor knife 43 can be provided to initially set the thickness of the structure. The liquid can be applied between the casting surface and the film by providing a reservoir in the region where the two come together as illustrated or the liquid can be brushed on the casting surface by some suitable means. The horizontal orientation of the casting surfaces is convenient but not critical, so that the casting surfaces can be inclined at any convenient angle.

What is claimed is:

1. A process for casting a structure, having at least one ripple-free surface, on a substantially smooth casting surface from a polymerizable material that shrinks upon polymerization, which comprises:
   (a) coating said casting surface with a liquid;
   (b) covering said liquid coated casting surface with a solid film in a manner such as to insure that said liquid forms a thin continuous layer between said casting surface and said film, said film being made from a material that has shrinkage properties similar to the shrinkage properties of said polymerizable material, said liquid being a liquid that will not vaporize appreciably at the temperature of the polymerization reaction and that will wet both said casting surface and said film without dissolving them, whereby the surface tension of said liquid will maintain said film in intimate contact with said casting surface and the low shear strength of said liquid will permit lateral movement of said film relative to said casting surface;
   (c) depositing said polymerizable material on said film; and
   (d) polymerizing said polymerizable material, whereby said polymerizable material will harden into a structure which is ripple-free on the surface which was next to said casting surface.

2. The process of claim 1 wherein:
   (a) said casting surface is a moving continuous casting surface and said film is a moving continuous film, and
   (b) the step of coating said casting surface with a liquid is accomplished by introducing the liquid at the point wherein said film and said casting surface first come together.

3. The process of claim 2 wherein the step of placing said film on top of the liquid coated casting surface in a manner such as to insure that said liquid forms a continuous layer between said film and said casting surface is accomplished by forcing said film and said casting surface together with the liquid layer between them by passing said film and the liquid coated casting surface between a pair of rollers.

4. The process of claim 1 wherein said liquid is a liquid selected from the group consisting of vegetable oils, silicone oils, petroleum oils, high-molecular weight alcohols and ethers.

5. The process of claim 1 wherein said polymerizable material comprises a methyl methacrylate polymer-in-monomer sirup, said film is a polyvinyl alcohol film, and said liquid is an oil.

6. The process of claim 5 wherein said oil is SAE 10 lubricating oil.

7. A process for casting a substantially smooth ripple-free structure between two substantially flat casting surfaces from a polymerizable material that shrinks upon polymerization, which comprises:
   (a) coating both casting surfaces with a liquid;
   (b) covering each liquid coated casting surface with a solid film in a manner such as to insure that said liquid forms a thin continuous layer between each of said casting surfaces and the film associated therewith, said film being made from a material that has shrinkage properties similar to the shrinkage properties of said polymerizable material, said liquid being a liquid that will not vaporize appreciably at the temperature of the polymerization reaction and that will wet said casting surfaces and said films, whereby the surface tension of said liquid will maintain each film in intimate contact with the casting surface associated therewith and the low shear strength of said liquid will allow lateral movement of each film relative to the casting surface associated therewith;
   (c) introducing said polymerizable material between the film covered casting surfaces, said casting surfaces being disposed substantially parallel to each other and separated by a distance equivalent to the desired thickness of said ripple-free structure; and
   (d) polymerizing said polymerizable material.

8. The process of claim 7 wherein:
   (a) said casting surfaces are both moving continuous casting surfaces and the film associated with each casting surface is a moving continuous film, and
   (b) the step of coating said casting surfaces with liquid is accomplished by introducing said liquid at the points where each film first comes together with the casting surface associated therewith.

9. The process of claim 8 wherein the step of covering each liquid coated casting surface with a film in a manner such as to insure that said liquid forms a continuous layer between each of said casting surfaces and the film associated therewith is accomplished by forcing each film and the casting surface associated therewith together with the liquid layer between them by passing each film and the liquid coated casting surface associated therewith between a pair of rollers.

10. The process of claim 8 wherein:
    (a) said casting surfaces are horizontal casting surfaces, the lower of the two casting surfaces being longer than the upper casting surface at the end where said polymerizable material is introduced between them; and
    (b) said polymerizable material is introduced between said casting surfaces by depositing it on the film covering the lower casting surfaces and allowing the moving casting surface to draw the polymerizable material between the film coated casting surfaces.

11. The process of claim 7 wherein said polymerizable material comprises a methyl methacrylate polymer-in-monomer sirup, said films are polyvinyl alcohol films and said liquid is oil.

References Cited

UNITED STATES PATENTS

| | | | |
|---|---|---|---|
| 2,426,402 | 8/1947 | Magrane et al. | 264—331 |
| 3,032,815 | 5/1962 | Gerber | 264—166 |
| 3,067,469 | 12/1962 | Yarrison | 264—316 |
| 3,383,448 | 5/1968 | Bader et al. | 264—166 |
| 3,488,246 | 1/1970 | Duggins | 264—75 |

ROBERT F. WHITE, Primary Examiner

G. AUVILLE, Assistant Examiner

U.S. Cl. X.R.

117—64, 138.8; 264—213, 216, 236, 316